Figure 1:
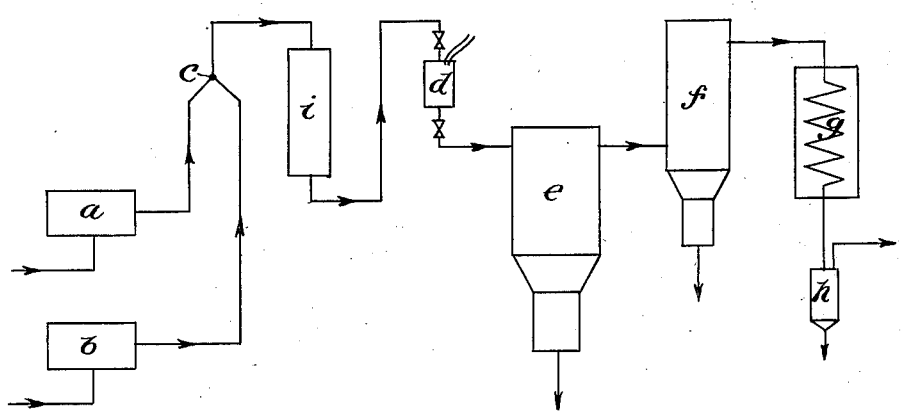

INVENTOR.
LAJOS von SZESZICH
BY
ATTORNEY.

Patented Mar. 14, 1939

2,150,790

UNITED STATES PATENT OFFICE 2,150,790

METHOD OF PRODUCING HIGH QUALITY CARBON BLACK

Lajos von Szeszich, Frankfort-on-the-Main, Germany

Application July 30, 1935, Serial No. 33,824
In Germany August 9, 1934

4 Claims. (Cl. 134—60)

The present invention relates to an improved method of producing high quality carbon black and to an apparatus therefor.

It is well known to produce carbon black by the combustion of oil in pans or in burners or by means of the combustion of gas in burners. The carbon black is usually collected in chambers from the waste combustion gases or in the flame proper by means of cooled surfaces. These prior methods have various disadvantages the more serious of which has been the difficulty of controlling and maintaining certain reaction conditions which were of great importance, especially the proportion of oxygen to the hydrocarbons. Certain external circumstances which were incapable of control, such as the humidity of air, the direction and velocity of wind, the air pressure and the like, often caused undesirable variations in the quality of the carbon black. The installations required for the prior processes were very bulky due to the fact that with the flame carbon process the carbon chambers and with the gas carbon process the combustion chambers occupied a great deal of space.

It is likewise known to ignite and to explode hydrocarbons mixed with oxygen or with other oxygen-containing gas at atmospheric or at elevated pressures so that in addition to the gaseous products, carbon black was also produced. Although little was known about the possibility of using such carbon black. The utilization of this reaction on a commercial scale was by no means obvious because the explosion of gas mixtures containing oxygen, especially if the initial mixture was already under high pressure, subjected the construction material constituting the explosion autoclaves to considerable pressures. At any rate only gas mixtures appeared practicable which contained just about the amount of oxygen which was absolutely necessary for the explosion. Only under such conditions, was it possible to control the reaction so that the explosion occurred slowly enough to avoid excessive stresses on the reaction chamber. It was especially important to use starting mixtures containing as little oxygen as possible because in the presence of greater quantities of oxygen the yield of carbon was greatly reduced by the combustion. Attempts were made to conduct the explosion of gas mixtures with a low oxygen content to produce a substantial yield of carbon. However, the carbon obtained was of an inferior quality. The carbon had a very light color and did not possess any of the "active qualities" required of a filling material in the manufacture of rubber. Although various proposals have been made, none, as far as is known, was wholly successful and satisfactory.

It has been discovered that carbon black of very excellent quality may be produced when an oxygen content is selected which is considerably greater than the quantity needed as a minimum for forming an explodable mixture.

It is an object of the invention to provide an improved method of producing high quality carbon black in a simple and effective manner.

A further object of the invention is to provide an improved method of producing high quality carbon black in a practical manner which can be carried into practice in an industrial scale and on an economic basis.

It is also within the contemplation of the invention to provide an apparatus for carrying the persent method into practice in a satisfactory and successful manner.

Figure 2:
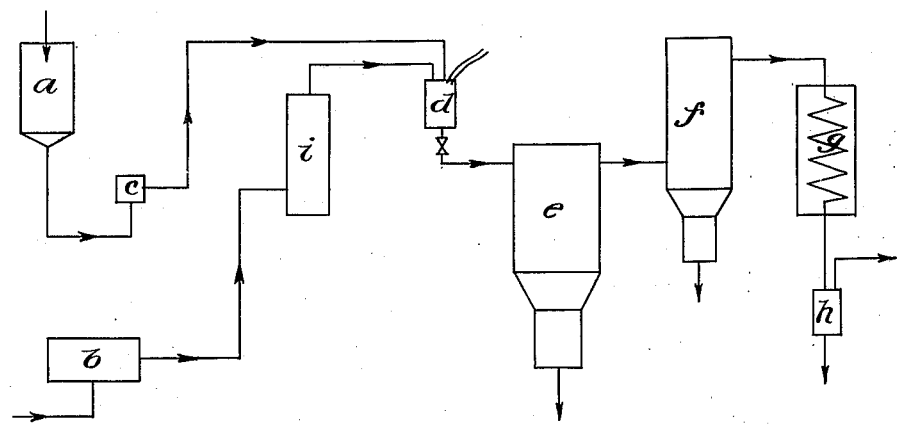

Other objects and advantages of the invention will become apparent from the following description taken in conjunction with the drawing in which:

Fig. 1 illustrates diagrammatically in elevation an apparatus for carrying the present invention into practice; and Fig. 2 is a view similar to Fig. 1 of a modified embodiment.

According to the principles of the present invention, a high quality carbon black may be produced which has a deep dark color and which is capable of imparting to rubber all of the good qualities required, especially for pneumatic tires, and which may also be used for manufacturing printer's ink. The carbon black obtained is in most cases better than even the best American gas carbons. The aforesaid effect of the oxygen content in the initial gas mixture is substantially independent of all other reaction conditions and is independent of the character of the initial carbon-containing materials. It has also been found that the stresses produced by the explosion of such mixtures are capable of being handled technically and industrially. Of course, the lower ignition limit depends not only upon the quantity of oxygen but also upon other conditions, particularly upon the selected initial pressure. According to the invention, it is important to select a greater oxygen content preferably considerably greater than the minimum quantity required to form an explosive gas mixture. According to the present process, it is easily possible to realize and to maintain optimum reaction conditions, such as pressure, temperature, composition of the gas and the like, so that all conditions of obtaining carbon black of uniform quality can be continuously maintained. The uniformity of the carbon black obtained by the present process is just as important for its various uses as its excellent quality.

It has also been found that it is important to remove the carbon produced in the reaction chamber after each explosion, since the presence of the carbon in the high temperature zone for any length of time and in the presence of additional explosion has a detrimental influence on the quality of the carbon.

The present invention and the results and principles thereof could not be predicted nor could one skilled in the art predict that these present measures are capable of being carried out practically in the present process. On the contrary, it was rather expected that in view of the relatively high explosion heat quick succession of explosions were impractical in view of the accumulation of heat. It has been found much to the surprise of those skilled in the art, however, that this was not the case, even when using large units. The expansion after each explosion not only completely removes the carbon formed but due to the approximately adiabatic dilatation an effective reduction of the temperature is produced. The present process is preferably carried out at elevated pressures because both the yield and throughput possibilities are increased.

The explosions may be carried out in a pressure chamber $d$ (Fig. 1) having such dimensions that it is capable of withstanding the working pressures. The ignition may be carried out by means of an ignition wire, spark plug and the like. It is likewise possible to provide automatic ignition by means of the high temperature within the reaction vessel. In order to easily control the temperature, the reaction vessel may be provided with cooling ribs, cooling jacket and the like. It is also advantageous to provide the explosion vessel with heating means so that it is possible to pre-heat the vessel especially when starting the operations. The quick removal of the reaction products is carried out by means of an outlet port (valve, slide or cock) which is desired may be automatically actuated by means of a camshaft and the like. The opening of the outlet port member may be obtained by means of other arrangements which are actuated directly or indirectly by means of the explosion pressure (automatic governor), for example, by means of an electromagnet, servo-motor (auxiliary motor) and the like. This second embodiment has the advantage that the opening of the outlet port is effected only after the explosion has actually taken place so that no explodable gas mixtures may enter into the carbon separator. The opening of the outlet port is carried out preferably in such manner that the carbon formed during the explosion and the reaction gas formed are removed in a stroke-like manner. It is especially advantageous to have a great number of ignitions in the unit of time in a certain apparatus. Means are provided to take care of the quick removal of the reaction products from the reaction vessel after each explosion. This measure not only considerably increases the throughput per apparatus unit but also facilitates efficient and trouble-less separation of the carbon and the emptying of the reaction autoclave. The introduction of the explodable mixture is carried out through an inlet port, such as, a valve, cock, or slide which is either positively actuated by means of a cam shaft or which is opened by the excess pressure of the gas mixture and is closed by a spring or by the explosion pressure after the pressure has been balanced. The last-mentioned automatic control of the inlet means prevents the propagation of the explosion impulse from the reaction vessel into the conduit and assures that the inlet member is only opened when the reaction vessel is already substantially emptied.

The introduction of the gases is preferably effected by means of two compressors, of which the one ($a$) (Fig. 1) propels and/or compresses the gases containing carbon while the other ($b$) propels and/or compresses the oxygen or the gas mixture containing oxygen. The mixing of the two reaction constituents is preferably carried out in a mixing arrangement or chamber ($c$) before entering the reaction vessel. The adjustment of the desired mixture proportion of the two gases is obtained by adjusting the output of the two compressors or by means of conventional automatic mixing controls. It is advisable to provide a pressure resistant tank ($i$) between the mixer and the reaction vessel ($d$), this tank should have a capacity which is multiple of that of the reaction vessel. This tank makes it possible to uniformly fill up the reaction chamber to the desired working pressure, and, on the other hand, it prevents the sudden occurrence of gas mixtures which are either too rich in oxygen or too poor in oxygen so that they are not capable of exploding. Such variations would otherwise occur due to the irregularities in the operation of the compressors. In the reaction vessel ($d$) the mixture of carbon-containing substances and oxygen-bearing gases is exploded to form carbon black and a combustible gas. The reaction products leaving the reaction vessel in the manner of a stroke and comprising gas and carbon black are conducted to a suitably dimensioned carbon separator. ($e$). The separation of carbon is preferably carried out in such manner that the reaction products are tangentially introduced into a drum-like container. By means of this separator, the greater part of the carbon produced is separated from the waste gases which contain but little carbon are led into a filter ($f$) for complete purification or into an electrical dust collecting system. Preferably, both the carbon separator and the cleaning system is maintained at a temperature which is above the dew point of the combustion or waste gases, so that the water produced by the reaction does not precipitate together with the carbon. This makes subsequent drying of the carbon unnecessary and prevents clogging of the filter. The waste gas after being completely freed from carbon is introduced into a cooler ($g$) in order to deposit the water formed during the reaction which is separated in separator ($h$) from the waste gas.

It has also been found that it is possible to start with tars, mineral oils or their distillation, extraction and conversion products instead of starting out from gases containing hydrocarbons. The aforesaid starting materials are treated in the same apparatus as the one described herein above. The liquid products are introduced by means of a pressure pump (Fig. 2) supplied from the tank ($a$) into the reaction vessel and, if necessary, are atomized or vaporized by means of nozzles or similar devices and/or are evaporated by maintaining the reaction vessel ($d$) and its walls at a high temperature. The oxygen or the gas containing oxygen is introduced by means of compressor ($b$). Oxygen, air, and waste gases containing free oxygen may be used to supply the oxygen. These gases may also contain in part oxidizable substances, such as, hydrogen whereby the lower ignition limit of the final starting mixture may be modified. Finally, it is likewise possible to use substances yielding oxygen, such as, nitrous gases. In some cases, it is advisable to preheat the liquid reaction products prior to their introduction or to mix them with a gas containing oxygen. In the conduit of the oxygen containing gases, preferably immediately before the reaction vessel, a tank (i) is inserted having a capacity several times that of the reaction vessel. This makes it possible to fill up the reaction vessel with the gas uniformly and very quickly. As described hereinabove, the closing members are positively or automatically controlled and the separation of the carbon black is carried out in the manner already described. The carbon separator and the cleaner are preferably maintained at a high temperature when treating liquid starting materials, so that the uncombusted oil particles are completely evaporated thereby making it unnecessary to subsequently treat the carbon produced. After the gases have been freed from carbon, they arrive at the cooler (g) in which the reaction water and the uncombusted oil particles are deposited. The separation of the gas from the liquid is carried out in the separator (h).

A further advantage of the present process consists in obtaining a high quality residual gas rich in hydrogen which contains up to 80% of the heat content of the initial gases. The residual gases may be used as heating gas in burners or may be employed as fuel for internal combustion motors.

For the purpose of giving those skilled in the art a better understanding of the invention, the following illustrative examples will be given.

Example No. 1

In an apparatus similar to the one described hereinabove, a gas obtained by decomposition of a coke oven gas is treated in connection with oxygen and at an initial pressure of about 6 atmospheres. The ignition of the gas mixture is carried out by means of a glow wire and the operation is regulated in such manner that about 100 explosions per minute are produced. The composition of the gas to be treated is as follows:

| Constituent | Amount |
| --- | --- |
|  | Percent |
| $CO_2$ | 0. |
| $C_nH_{2n}$ | 25.2 (carbon number 2.2). |
| $O_2$ | 0.0. |
| $CO$ | 1.2. |
| $H_2$ | 0.0. |
| $C_nH_{2n+2}$ | 70.0 (carbon number 1.3). |
| $N_2$ | 3.6. |

The lower ignition limit at about 6 atmospheres initial pressure is at an oxygen concentration of about 28%. Only carbon black with practically useless qualities may be obtained in this manner. The experimental results for different $O_2$ concentration of the mixture are the following:

| $O_2$ in the initial gas percent | Carbon black yield in proportion with the C content of the initial gas percent | Coloring ability factor | Rubber testing | |
| --- | --- | --- | --- | --- |
| | | | Breaking strength kg/cm. | Breaking elongation, percent |
| 30.8 | 37.8 | 1.50 | 193 | 463 |
| 36.8 | 20.3 | 1.70 | 214 | 579 |
| 41.8 | 19.7 | 1.85 | 229 | 605 |

When determining the coloring strength coefficient (factor), the depth of color of the carbon is compared with the commercial Sechsbrand carbon as a standard and baryte (heavy spar) mixture and taking the coloring depth of the Sechsbrand carbon as the unit. The test with rubber is carried out in the conventional manner. The numbers given correspond to average figures obtained from a number of tests with different duration of the vulcanization. The corresponding values for the well known American rubber carbon are:

Breaking strength _____ kg/cm² __ 213
Breaking elongation _____ per cent __ 578

In the waste gases which according to the reaction conditions contain about 24–35% CO, about 51 to 57% $H_2$, about 15 to 2% $CH_4$, and about 80 to 85% of the heating value of the gases used is retained.

Example No. 2

A gas obtained by cracking mineral oil is treated at about 6 atmospheres in the same manner as in Example No. 1. The composition of the gas is as follows:

| Constituent | Amount |
| --- | --- |
|  | Percent |
| $CO+H_2$ | 0.5 |
| $CH_4$ | 1.0 |
| $C_2H_6$ | 30.0 |
| $C_2H_8$ | 36.0 |
| $C_2H_4$ | 4.0 |
| $C_3H_6$ | 7.0 |
| $C_4H_8$ | 17.5 |

The lower ignition limit is at about 6 atmospheres initial pressure at an oxygen concentration of about 27.5%. If this gas mixture is exploded, carbon of altogether insufficient coloring ability is obtained. When, however, the above gas is treated with 48.7% oxygen, carbon black having a coloring strength coefficient of 1.50 is obtained and in addition this carbon is capable of giving rubber a tensile strength of 191 kg/cm² and a breaking elongation of 482%.

Example No. 3

The cracked gas of Example No. 2 is worked up with air enriched with oxygen and containing about 50% oxygen. At about 6 atmospheres, the proportion between cracked gas and oxygen is about 1:1.2. A yield of 22% carbon black is obtained having a color strength coefficient of 1.8 and capable of giving a tensile strength of 233 kg. and a breaking dilatation of 574% to rubber. This carbon black is especially advantageous for manufacturing printing colors and exceeds the quality of the best American carbon black.

Example No. 4

In the above-described apparatus for treating liquid hydrocarbons through a nozzle, benzene is introduced into the reaction vessel by means of a pump with a piston. At the same time air is introduced through a valve by means of a compressor as in the previous example. The proportion of benzene to air is so adjusted that about 3 cubic meters of air are admitted for about 1 kg. of benzene. The initial pressure in the reaction vessel is adjusted to 15 atmospheres. A good yield of carbon is obtained, the carbon having a coloring strength coefficient of 1.8, and capable of giving to rubber a tensile strength of 263 kg/cm² and a breaking dilatation of 576% according to the standard test.

Example No. 5

The experiment described in Example No. 4 with benzene is carried out with air enriched with oxygen instead of air. The air is enriched in oxygen to contain about 35% oxygen and the proportion of benzene to the oxygen containing gas is so adjusted that 4.3 cubic meters of oxygen are used for 1 kg. benzene. In this case, it is possible to work at considerably lower initial pressures and to obtain carbon just as good as the one in Example No. 4, and the waste gas has specially high caloric power. The carbon obtained at initial pressures of about 4 atmospheres has a coloring strength coefficient of 1.8 and gives to rubber a tensile strength of 287 kg/cm² and a breaking dilatation of 580%.

I claim:

1. The method of producing high quality carbon black which comprises admixing a fluid substance containing hydrocarbons with oxygen-containing gages to form an explodable mixture of homogeneous composition throughout, said mixture having an oxygen concentration of at least about 40% sufficient to combust a substantial portion of the carbon present to oxides of carbon but being insufficient for complete combustion of said mixture, exploding said mixture in a chamber to form carbon black of high quality and residual gases, and separating said carbon black.

2. The method of producing high quality carbon black which comprises admixing a fluid substance containing hydrocarbons with oxygen-containing gases at an initial pressure of at least 4 atmospheres to form an explodable mixture of homogeneous composition throughout, said mixture having an oxygen concentration of at least about 40% and sufficient to combust a substantial portion of the carbon present to oxides of carbon but being insufficient for complete combustion of said mixture, exploding said mixture in a chamber to form carbon black of high quality, and separating said carbon black.

3. The method of producing high quality carbon black which comprises admixing a fluid substance containing hydrocarbons with oxygen-containing gases at an initial pressure of about 6 atmospheres to form an explodable mixture of homogeneous composition throughout, said mixture having an oxygen concentration of at least about 40% and sufficient to combust a substantial portion of the carbon present to oxides of carbon but being insufficient for complete combustion of said mixture, exploding said mixture in a chamber to form carbon black of high quality, and separating said carbon black.

4. The method of producing high quality carbon black that involves the repetition of a cycle which comprises introducing into a chamber a fluid substance containing hydrocarbons with oxygen-containing gases to form an explodable mixture of homogeneous composition throughout, said mixture having an oxygen concentration of at least about 40% and sufficient to combust a substantial portion of the carbon present to oxides of carbon but being insufficient for complete combustion of said mixture, exploding said mixture in said chamber to form carbon black and residual gases, and removing said reaction products from said chamber immediately after the explosion to separate high quality carbon black therefrom.

LAJOS von SZESZICH.